Aug. 8, 1944.  E. O. BERNHARDT ET AL  2,355,411
HARDNESS TESTING INSTRUMENT
Filed Jan. 30, 1941
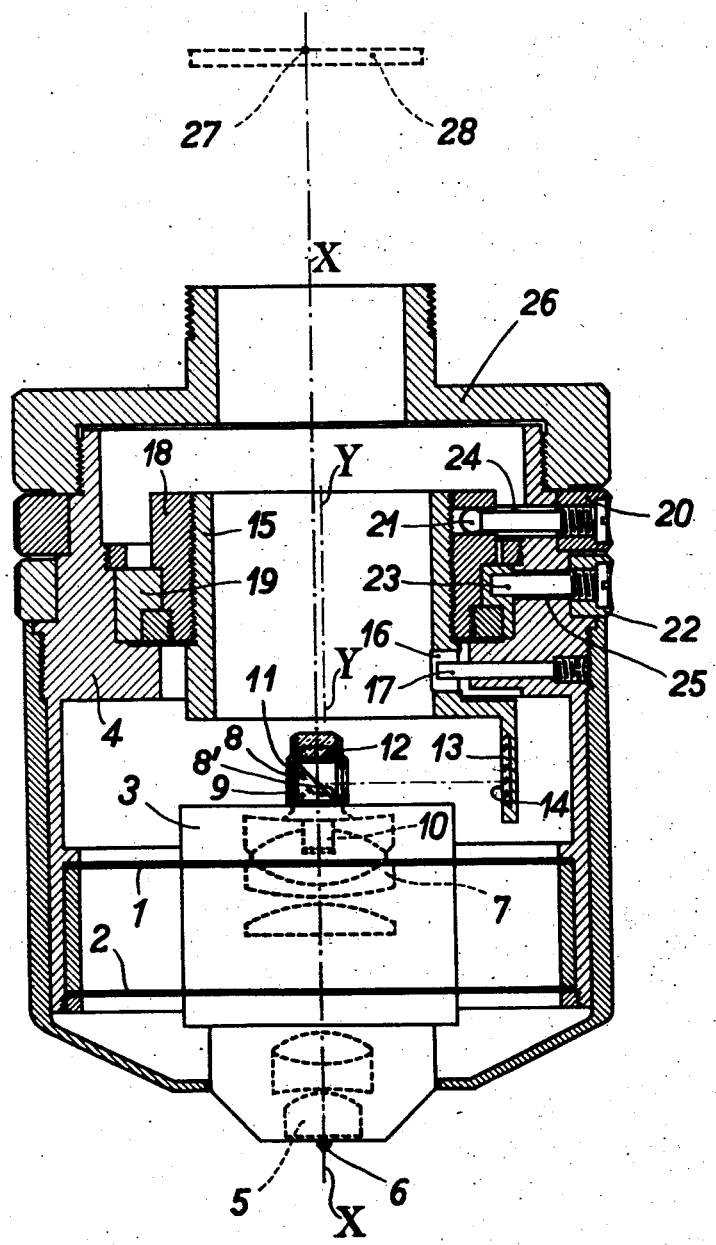
Inventors:
Eugen Oskar Bernhardt
Hermann Lipfert Patented Aug. 8, 1944

2,355,411

UNITED STATES PATENT OFFICE 2,355,411

HARDNESS TESTING INSTRUMENT

Eugen Oskar Bernhardt and Werner Bischoff, Jena, Germany; vested in the Alien Property Custodian Application January 30, 1941, Serial No. 376,576
In Germany February 1, 1940

2 Claims. (Cl. 265—12)

The invention relates to a microscope for determining the hardness of a substance, the microscope containing an indentation body of hard material for producing impressions in the substance under investigation and a device for measuring such impressions, the indentation body being elastically attached to the microscope in the direction of the optic axis of the objective by means of a spring whose purpose it is to create a test load.

According to the invention the microscope is equipped with an optical test load-indicating device consisting of a scale in fixed position and of an optical system connected with an indentation body and containing at least one reflecting member. With the aid of the optical system the scale is being imaged in the ocular image-plane and the spring-action occasioned when the indentation body rests on the substance to be tested indicated by means of a pointer which is either provided for in the ocular image-plane or which is connected with the indentation body and moves past the scale. The pointer may also be provided in fixed position and the scale movable.

In order to be able to adjust the scale relative to the pointer and in respect of its distance from the imaging system, it will be of advantage if the scale is adjustably disposed, be it in the direction of the optic axis of the objective or at right angles to that direction.

Primarily in the case of metallographical and mineralogical investigations where the hardness is to be determined of large and small crystals lying next to each other, the optical test load-indicating device affords the advantage to employ, without the previous manipulation of adjusting elements, the test load required for the respective crystal and to constantly keep the observer informed of what test load is being employed at the respective moment.

A constructional example of the invention is illustrated in the annexed drawing, part of which shows a longitudinal section containing the axis of the objective.

By means of two annular springs 1 and 2 the mount 3 of a microscope objective is elastically mounted to a supporting body 4 in the direction of the optic axis X—X of the objective. An indentation body 6, shaped substantially as shown in the drawing with its point substantially in alignment with the optical axis of the testing device is mounted on the front lens 5, whereby impressions may readily be produced in the material being tested. Substantially centrally of the rear lens 7 is mounted a prism 8, which is secured by means of pin 10 seated in the prism mount 9 and fitting within an opening in the rear lens. The surface 8' of prism 8 is coated with a reflecting layer. As the greater portion of the imaging rays are passing by the indentation body and the prism, the object will be observable through the microscope even though the indentation body and the prism lie in the central portion of the imaging bundle of rays surrounding the optic axis. On the mount 9 a collective lens 12 is seated in a second mount 11. With the aid of said collective lens 12 the scale 14, which is provided for on a glass plate 13 and which runs parallel to the optic axis of the objective, is imaged in the ocular image-plane of the microscope. In this image-plane a glass plate 28 is disposed provided with a pointer 27 which latter, for reading purposes, indicates on scale 14 the test load which is produced when setting the indentation body 6 upon the substance to be tested. The scale 14 is displaceable both in the direction of the optic axis of the objective when the zero point is to be set, or at right angles to said direction when the scale is to be sharply focused in the ocular image-plane of the microscope. For this purpose the glass plate 13 is attached to a tube-stud 15 which is prevented from rotating by a bolt 17 which is mounted on the supporting body 4 and protrudes into a slot 16 running parallel to the axis of said tube-stud. The latter is provided with external thread upon which a ring 18 is seated which, via an intermediate ring 19, is so disposed on the supporting body 4 that it cannot be displaced in the direction of the optic axis of the objective. By means of an adjusting collar 20 the ring 18 can be slewed from the outside via a dog 21, thus resulting in an axial displacement of the tube-stud 15. Also the ring 19 can be slewed from the outside via a dog 23 by means of an adjusting collar 22. The bore of ring 19 lying eccentrically to the convex surface of said ring, so that the axis Y—Y of the bore does not coincide with the axis of the rotating body determined by the convex surface of the ring, it will be possible, by slewing the ring 19, to cause a movement of tube-stud 15 in a direction at right angles to the optic axis X—X of the objective thus effecting the scale to be sharply focused. For the dog 21 or 23, respectively, a traverse slot 24 or 25, respectively is provided for on the supporting body 4. By means of an intermediate piece 26 the supporting body 4 must be imagined to be attached either to a changing device provided for on the microscope tube or to be attached directly to the microscope tube.

The microscope is operated in the following manner. To begin with, that respective spot of the material in question whose hardness is to be tested must be found. To this end a microscope is used having a graticule which is disposed on the plate glass 28 and lies in the ocular image-plane, with the intersecting point of the two cross wires lying in the optic axis of the microscope. With the aid of said graticule the material under investigation is then aligned, whereupon the indentation body 6, by means of a displacement of the supporting body 4 in the direction of the optic axis, is pressed against the material under investigation until the point of the indentation body sinks into the material at the required spot. During this procedure the observer observes the test load which is indicated on the scale in the ocular image-plane and brought about by the indentation body being pressed into the material, whereby the pressure is continued until the required test load is arrived at. This done, the supporting body 4 is retracted again and the point of indentation measured in the known manner by means of a measuring device connected with the microscope.

We claim:

1. An instrument including a microscope having a tube for testing the hardness of a substance, comprising an indentation body of hard material disposed on the axis of said tube for producing an impression in said substance, a spring system connected with said tube and coating with said indentation body and allowing a movement of said indentation body parallel to the optic axis of said microscope, an indicating device comprising a scale member and an index member adapted to coact with each other, at least one of these members being fitted to said tube at the image plane, and an optical system connected with said indentation body and interposed between the other of said members and the image plane of said microscope, said optical system being adapted to form an image of the other of said members in the image-plane of said microscope.

2. An instrument including a microscope having a tube for testing the hardness of a substance, comprising an indentation body of hard material disposed on the axis of said tube for producing an impression in said substance, a spring system connected with said tube and coacting with said indentation body and allowing a movement of said indentation body parallel to the optic axis of said microscope, an indicating device comprising a scale member and an index member adapted to coact with each other, a support fitted to said tube and connected with one of said members, the other of said members being fitted to said tube at the image plane, an optical system connected with said indentation body and interposed between said support and the image plane of said microscope, said optical system being adapted to form an image in the image-plane of said microscope of that one of said members which is connected with said support, and means for moving said support parallel and at right angles to the optic axis of said microscope.

EUGEN OSKAR BERNHARDT.
WERNER BISCHOFF.